Patented Feb. 22, 1949

2,462,391

UNITED STATES PATENT OFFICE 2,462,391

TREATMENT OF AROMATIC HYDROCARBONS

Howard D. Hartough, Pitman, N. J., Alvin I. Kosak, Columbus, Ohio, and Ebenezer E. Reid, Baltimore, Md., assignors to Socony-Vacuum Oil Company, Incorporated, a corporation of New York No Drawing. Application January 23, 1946, Serial No. 642,978

20 Claims. (Cl. 260—674)

This invention relates to a process for the desulfurization of hydrocarbons and, more particularly, to a process for the removal of thiophene and derivatives thereof from aromatic hydrocarbons.

It is well known that aromatic compounds, such as benzene, toluenes, xylenes, and mixtures of hydrocarbons, such as those derived from coal tar and petroleum distillates, contain small amounts of thiophene or derivatives thereof. The thiophenes so contained as impurities in the aromatic hydrocarbon often interfere with the intended use of the latter compound. For example, in the dye industry small quantities of thiophene present in the benzene and toluene used in the production of aniline and toluidine must be removed therefrom in order to avoid a yellow tint in the resultant dye. Likewise, thiophene-free benzene is required in certain processes for the manufacture of chlorobenzene in the making of chemically pure aromatic derivatives employed in the preparation of medicinals and in drug manufacture. Thiophene-free benzene is also required when this material is used as a fuel or a gasoline component in internal combustion engines. Many other commercial processes and uses involving aromatic hydrocarbons require that they be free of thiophene.

Numerous methods have heretofore been attempted or have been used with a moderate degree of success in removing contaminating quantities of thiophene from aromatic compounds. However, even the best methods previously employed have been objectionable in that relatively high losses of aromatic compounds were incurred in the separation process. Thus, the process most generally used heretofore is that accredited to Victor Meyer which consists in agitating the benzene to be treated with concentrated sulfuric acid. This method is predicated on the fact that thiophene sulfonates more readily than benzene and that the resulting sulfonated thiophene is extracted by the excess acid present. Even with efficient operation of this process, it has been impossible to reduce the benzene losses below about 8-12 per cent. Moreover, since a highly concentrated acid of a strength greater than 66° Baumé is required, it has been necessary to use acid resistant equipment and extreme care in operation of the process.

Other methods which have found application in the separation of thiophene from benzene have involved the destruction of thiophene by a reaction promoting polymerization or a breaking of the thiophene ring. Such methods have included treating the contaminated benzene with hydrogen in the presence of a catalyst, heating with aluminum chloride to decompose the thiophene present, or extracting the benzene or other hydrocarbon with neutral ferric hydroxide and a glycol. Various other modifications of these methods have been used. However, they have not found wide-spread use, since they are generally more expensive than the sulfuric acid treatment mentioned above and are also objectionable, since the destruction of the thiophene contained in the benzene eliminates the possibility of obtaining a valuable by-product.

Still other processes of separation have made use of the fact that thiophene is generally more reactive than benzene. These processes have separated thiophene from benzene by converting the thiophene to a higher boiling derivative by a chemical reaction and distilling to produce a thiophene-free product. Thus, thiophene has been separated in this general manner by various chlorination, bromination, nitration, iodination, and acetylation reactions. These processes have only been commercially successful to a slight degree since the benzene, while less reactive than the thiophene, is still attacked during the separation process and, hence, the benzene losses have been relatively high. Furthermore, these processes have been accompanied by various side reactions tending to still further decrease the yield of thiophene-free benzene obtained. Thus, in the process involving separation of the thiophene by acetylation, which comprises reacting the hydrocarbon to be treated with acetyl chloride and a catalyst of aluminum chloride or phosphorus pentoxide, the reaction is complicated by the formation of addition complexes between the catalyst used and the carbonyl group of the resulting acetylated thiophene. Moreover, since catalysts such as aluminum chloride likewise tend to promote the acetylation of benzene, losses occur in the yield of desired thiophene-free benzene, since a portion of the benzene enters into the acetylation reaction.

These difficulties inherent in the prior art processes have now largely been overcome in accordance with the present invention. It has now been discovered that thiophene and derivatives thereof can be removed from aromatic hydrocarbons by reacting said hydrocarbons with an acylating agent in the presence of a porous, adsorptive silica-hydrous metallic oxide catalyst and distilling the resulting reaction mixture to produce thiophene-free hydrocarbon. Thus, by employing a silica-hydrous metallic oxide catalyst in preference to those formerly used, the formation of addition complexes which heretofore complicated the separation process has been eliminated and in addition a more efficient yield of thiophene-free benzene is obtained, since the silica-hydrous metallic oxide catalyst employed herein specifically promotes the acylation of thiophene without affecting the benzene or other aromatic hydrocarbon present.

It is, accordingly, an object of the present invention to provide an efficient process for separating thiophene from aromatic hydrocarbons. Another object is to provide a process for removing thiophene from aromatic hydrocarbons by catalytically acylating thiophene and distilling. A still further object is to afford a process for removing thiophene from aromatic hydrocarbons by catalytically acylating thiophene in a relatively simple and direct manner which can be easily carried out using an inexpensive, easily obtainable catalyst and distilling to produce a thiophene-free hydrocarbon. A very important object is to provide a means of removing thiophene from aromatic hydrocarbons by converting the thiophene to high boiling acylated derivatives without appreciably affecting the hydrocarbon present.

These and other objects which will be recognized by those skilled in the art are attained in accordance with the present invention, wherein thiophene or its derivatives are removed from aromatic hydrocarbons or mixtures thereof, such as coal tar and petroleum distillates, by treating said hydrocarbons with an organic carboxylic acid anhydride or acyl halide in the presence of a porous, adsorptive silica-hydrous metallic oxide catalyst and distilling to give thiophene-free hydrocarbon.

Representative of the catalysts employed herein are silica-alumina, silica-zirconia, silica-thoria, and silica-hematite. Naturally occurring silica-alumina clays of the montmorillonite type which have been activated have been found to be effective catalysts for promoting the acylation of thiophenes. Typical of such products is the material sold under the trade name of Super Filtrol. Other clays contemplated for use in the present process include fuller's earth and Attapulgus clay, such as is commonly used for percolation of lubricating oils. In addition to the natural silica-alumina clays, synthetic silica-alumina catalysts, such as those extensively employed in the cracking of petroleum hydrocarbons, may be used. These catalysts are synthetic, porous, adsorptive composites comprising silica and alumina, which may be formed in various ways, as, for example, precipitating silica on alumina, or alumina on silica, or by combining a silica gel with alumina or by preparing a silica-alumina gel.

The acylating agents to be used herein may be an organic carboxylic acid anhydride or an acyl halide. Included in the former category are compounds, such as the ketenes, having the basic structural formula

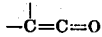

and which, upon addition of water, yield organic carboxylic acids. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used.

While the process of this invention is most generally applicable to the purification of the simple aromatic hydrocarbons such as benzene and toluene, the acylating agents disclosed above will react with thiophene and its derivatives in more complex hydrocarbon mixtures and thus afford a general method of desulfurization wherever the sulfur content of the material is due to compounds of the thiophene type. Thus, in addition to thiophene, substituted derivatives thereof, such as the halogen, alkyl, aryl or alkoxy derivatives, may be removed from aromatic hydrocarbons.

In dealing with benzene and its homologs, it is desirable to employ a higher boiling acylating agent, such as capric and higher anhydrides, to facilitate separation of the hydrocarbon from the anhydride and the ketone and acid formed during the reaction, said separation being most easily accomplished by distillation. While, of course, the lower anhydrides such as acetic anhydride may also be used, the corresponding acid evolved is difficult to separate from the hydrocarbon by distillation, necessitating the introduction of an additional step in the process, namely, removal of the acid by neutralization and water washing. Likewise, when the acyl halides are employed as acylating agents, an additional step is required to eliminate the hydrogen halide formed.

The quantity of acylating agent to be introduced into the hydrocarbon to be treated will depend on the amount of thiophenic contaminant present. If, as is usually the case, the aromatic material to be treated has a more or less constant amount of thiophenes contained therein, the quantity of acylating agent to be used may readily be determined after a few preliminary runs and adjusted accordingly. The amount of silica-alumina catalyst employed may vary over wide limits. However, generally it has been found preferable to use about 5 to about 10 per cent by weight of the reactants. If aromatic material is to be treated having a varying thiophenic content, it is preferable to use an excess quantity of acylating agent and catalyst, distill off the thiophene-free aromatic and introduce additional quantities of aromatic stock to the previously used acylating agent and catalyst. Employing this latter technique, an efficient, continuous desulfurizing process can be established simply by passing the aromatic material to be treated into a vessel containing an excess quantity of catalyst and acylating agent, reacting the resulting mixture to effect acylation of the thiophene present and distilling off the thiophene-free aromatic.

The rate of the acylation reaction appears to be a function of the temperature, increasing with increasing temperatures, the upper limit of temperature being dependent on the boiling point of the reactants at the specific pressure of the reaction. In general, temperatures varying between about 80° C. and about 150° C. and pressures varying between atmospheric and about six atmospheres have been found satisfactory for effecting the acylation reaction. The effect of increased reaction pressure theoretically is toward increased reaction but from a practical standpoint, this is not a very great effect with reactions such as those involved herein, which go readily at normal pressures. In general, the reaction period will vary from about 1 to about 10 hours, depending on the thiophenic content of the material being treated.

The silica-metallic oxide catalyst may be employed in amounts as little as 2% by weight of the reactants. However, amounts varying between about 5 per cent and about 10 per cent by weight are to be preferred. The catalyst, as indicated, may be a natural clay of the montmorillonite type or a synthetic silica-hydrous oxide composite, such as silica-zirconia, silica-alumina, silica-hematite and silica-thoria. Generally, clays which have been activated by acid treatment and heating at elevated temperatures and which have a weight ratio of silica to alumina of not less than 3:1 and preferably from 4:1 or higher will be used. The amount of silica will usually vary from about 70–80 per cent and the amount of alumina from about 10–20 per cent by weight of the clay. The remaining components comprising particularly ferric oxide, calcium oxide and magnesium oxide should comprise less than 10 per cent of the clay. Typical of the activated clays which may be employed herein are those known to the art as Super Filtrol and Attapulgus clay.

Synthetic silica-alumina catalysts may be prepared in numerous ways well known to the art by the formation of gels or gelatinous precipitates, comprising essentially silica and alumina. A representative method of preparing such synthetic catalysts is described in U. S. Patent 2,232,722 to Peterkin et al. A particularly effective catalyst was found to be spheroidal pellets of silica-alumina gel prepared by mixing an acidic stream of aluminum sulphate and a stream of sodium silicate and allowing the resulting sol to be ejected from a nozzle into an oil column, where the gel sets in the form of beadlike pellets. The resulting gel spheres, after washing, drying and tempering, were utilized for promoting the acylation of thiophenic contaminant present in the hydrocarbon to be treated. A further description of the method of preparing the above-described silica-alumina spheroidal pellet is disclosed in U. S. Patent 2,384,946, issued September 18, 1945, to Milton M. Marisic. The catalyst, whether a synthetic composite or a natural clay, should preferably have a fairly small particle size. After repeated use in the separation process, the spent silica-hydrous metallic oxide catalyst may be reactivated by heating at an elevated temperature for a period sufficient to restore its original activity.

The acylated thiophenes produced as by-products in the above-described process are useful as solvents, dye intermediates, addition agents for petroleum fractions, plasticizers, odorants, perfume diluents, resin intermediates and intermediates for chemical synthesis. Long chain alkyl thienyl ketones may also find uses as synthetic lubricants, waxes, extreme pressure additives for mineral oils and anti-foaming agents.

The following examples will serve to illustrate the process of this invention without limiting the same:

Example 1

A mixture of 50 grams of a benzene-thiophene solution containing 0.50 per cent sulphur, 50 grams of 95 per cent acetic anhydride, and 10 grams of Super Filtrol clay was refluxed for 4 hours at 88–91° C. The catalyst was removed by filtration and the liquid product was distilled through a fractionating column. The distillate boiling in the benzene range was collected and found to be substantially free of sulphur, containing only 0.026 per cent sulphur.

Example 2

A mixture of 150 grams of benzene containing 0.030 per cent sulphur, 50 grams of acetic anhydride, and 15 grams of Super Filtrol clay was refluxed at 84–86° C. for 2 hours. The catalyst was removed by filtration and the liquid product was distilled, and the distillate water-washed free of acid. The distillate boiling in the benzene range was found to contain 0.005 per cent sulphur.

Example 3

A mixture of 200 grams of a benzene-thiophene solution containing 0.197 per cent sulphur, 50 grams of acetic anhydride, and 35 grams of Super Filtrol clay was refluxed for 1 hour at 84–85° C. 100 grams of the benzene were then removed by distillation through a fractionating column employing a current of air to minimize bumping. An additional 100 grams of the benzene-thiophene solution was then added to the reaction mixture and the whole again refluxed for 1 hour, followed by distillation of 68.5 grams of the product. The first cut of benzene was found to contain 0.003 per cent sulphur and the second, 0.02 per cent sulphur.

Example 4

A mixture of 150 grams of benzene containing 0.197 per cent sulphur, 25 grams of propionic anhydride, and 15 grams of Super Filtrol clay was heated at 77–85° C. for 3 hours. The product was filtered, distilled, and the distillate water washed free of acid. The distillate boiling in the benzene range was collected and found to contain 0.020 per cent sulphur.

Example 5

To 150 grams of benzene containing 0.176 per cent of thiophenic sulphur were added 50 grams of acetic anhydride and 10 grams of a synthetic silica-alumina catalyst containing about 8 per cent alumina and about 92 per cent silica and ground to pass through a 60-mesh screen. The mixture was refluxed for 4 hours at 84–85° C. At the end of this time, the mixture was cooled, the catalyst removed by filtration and water-washed to remove acetic anhydride. The resulting filtrate and washings were distilled. The distillate boiling in the benzene range was collected and found to contain 0.062 per cent sulphur.

Example 6

To 150 grams of benzene containing 0.176 per cent of thiophenic sulphur were added 50 grams of acetic anhydride and 10 grams of a synthetic silica-alumina catalyst containing from about 70–80 per cent silica and from about 10–20 per cent alumina. The mixture was refluxed for 4 hours at 84–85° C. At the end of this time, the mixture was cooled, the catalyst removed by filtration and water-washed to remove acetic anhydride. The resulting filtrate and washings were distilled. The distillate boiling in the benzene range was collected and found to contain 0.086 per cent sulphur.

Example 7

To 150 grams of benzene containing 0.176 per cent of thiophenic sulphur were added 50 grams of acetic anhydride and 10 grams of a catalyst containing 10 per cent zirconia and 90 per cent silica. The mixture was refluxed for 4 hours at 84–85° C. At the end of this time, the mixture was cooled, the catalyst removed by filtration and water-washed to remove acetic anhydride. The resulting filtrate and washings were distilled. The distillate boiling in the benzene range was collected and found to contain 0.110 per cent sulphur.

We claim:

1. A method for removing thiophenic contaminant from an aromatic hydrocarbon containing the same, comprising the addition thereto of an acylating agent selected from the group consisting of acyl halides and anhydrides of carboxylic acids and a porous, adsorptive silica-zirconia catalyst, reacting the resulting mixture to effect acylation of said thiophenic contaminant and thereafter distilling to yield said hydrocarbon free of said contaminant.

2. A method for removing thiophenic contaminant from an aromatic hydrocarbon containing the same, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said hydrocarbon free of said contaminant.

3. A method for removing thiophenic contaminant from an aromatic hydrocarbon containing the same, comprising the addition thereto of an acylating agent selected from the group consisting of acyl halides and anhydrides of carboxylic acids and a porous, adsorptive synthetic silica-alumina composite, reacting the resulting mixture to effect acylation of said thiophenic contaminant and thereafter distilling to yield said hydrocarbon free of said contaminant.

4. A method for removing thiophenic contaminant from an aromatic hydrocarbon containing the same, comprising the addition thereto of an acylating agent selected from the group consisting of acyl halides and anhydrides of carboxylic acids and a porous, adsorptive silica-alumina catalyst, the silica-alumina ratio of which varies from about 3:1 and about 8:1, reacting the resulting mixture to effect acylation of said thiophenic contaminant and thereafter distilling to yield said hydrocarbon free of said contaminant.

5. A method for removing thiophenic contaminant from coal tar containing the same, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said tar free of said contaminant.

6. A method for removing thiophenic contaminant from benzene containing the same, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said benzene free of said contaminant.

7. A method for removing thiophenic contaminant from a xylene containing the same, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said xylene free of said contaminant.

8. A method for removing thiophenic contaminant from a toluene containing the same, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said toluene free of said contaminant.

9. A method for removing thiophenic contaminant from an aromatic hydrocarbon containing the same, comprising the addition thereto of an acylating agent selected from the group consisting of acyl halides and anhydrides of carboxylic acid and a porous, adsorptive silica-zirconia catalyst, reacting the resulting mixture at a temperature of from about 80 to about 150° C. for a period of from about 1 to about 10 hours, and thereafter distilling to yield said hydrocarbon free of said contaminant.

10. A method for removing thiophenic contaminant from an aromatic hydrocarbon containing the same, comprising the addition thereto of an acylating agent selected from the group consisting of acyl halides and anhydrides of carboxylic acid and a porous, adsorptive silica-alumina catalyst, reacting the resulting mixture at a temperature of from about 80 to about 150° C. for a period of from about 1 to about 10 hours, and thereafter distilling to yield said hydrocarbon free of said contaminant.

11. A method for removing thiophenic contaminant from benzene containing the same, comprising the addition thereto of an acylating agent selected from the group consisting of acyl halides and anhydrides of carboxylic acid and a porous, adsorptive silica-alumina catalyst, reacting the resulting mixture at a temperature of from about 80 to about 150° C. for a period of from about 1 to about 10 hours, and thereafter distilling to yield said benzene free of said contaminant.

12. A method for removing thiophenic contaminant from a xylene containing the same, comprising the addition thereto of an acylating agent selected from the group consisting of acyl halides and anhydrides of carboxylic acid and a porous, adsorptive silica-alumina catalyst, reacting the resulting mixture at a temperature of from about 80 to about 150° C. for a period of from about 1 to about 10 hours, and thereafter distilling to yield said xylene free of said contaminant.

13. A method for removing thiophenic contaminant from a toluene containing the same, comprising the addition thereto of an acylating agent selected from the group consisting of acyl halides and anhydrides of carboxylic acid and a porous, adsorptive silica-alumina catalyst, reacting the resulting mixture at a temperature of from about 80 to about 150° C. for a period of from about 1 to about 10 hours, and thereafter distilling to yield said toluene free of said contaminant.

14. A method for removing thiophenic contaminant from an aromatic hydrocarbon containing the same, comprising the addition thereto of an acyl halide and a porous, adsorptive silica-alumina catalyst, reacting the resulting mixture to effect acylation of said thiophenic contaminant and thereafter distilling to yield said hydrocarbon free of said contaminant.

15. A method for removing thiophenic contaminant from an aromatic hydrocarbon containing the same, comprising the addition thereto of a carboxylic anhydride and a porous, adsorptive silica-alumina catalyst, reacting the resulting mixture to effect acylation of said thiophenic contaminant and thereafter distilling to yield said hydrocarbon free of said contaminant.

16. A method for removing thiophenic contaminant from an aromatic hydrocarbon containing the same, comprising the addition thereto of acetic anhydride and a porous, adsorptive silica-alumina catalyst, reacting the resulting mixture to effect acylation of said thiophenic contaminant, distilling and water-washing the resultant distillate free of acid to yield said hydrocarbon free of said contaminant.

17. A method for removing thiophenic contaminant from an aromatic hydrocarbon containing the same, comprising contact thereof with an acylating agent selected from the group consisting of acyl halides and anhydrides of carboxylic acids in the presence of a catalyst selected from porous, adsorptive silica-alumina and silica-zirconia composites, reacting the resulting mixture to effect acylation of said thiophenic contaminant and thereafter distilling to yield said hydrocarbon free of said contaminant.

18. A method for removing thiophenic contaminant from an aromatic hydrocarbon containing the same, comprising the addition thereto of an acylating agent selected from the group consisting of acyl halides and anhydrides of carboxylic acids and a porous, adsorptive naturally occurring silica-alumina composite, reacting the resulting mixture to effect acylation of said thiophenic contaminant and thereafter distilling to yield said hydrocarbon free of said contaminant.

19. A method for removing thiophenic contaminant from a petroleum distillate containing aromatic hydrocarbons and said thiophenic contaminant, comprising the addition thereto of an acylating agent selected from the group consisting of acyl halides and anhydrides of carboxylic acids and a porous, adsorptive silica-alumina catalyst, reacting the resulting mixture to effect acylation of said thiophenic contaminant and thereafter distilling to yield said distillate free of said contaminant.

20. A method for removing thiophenic contaminant from an aromatic hydrocarbon containing the same, comprising the addition thereto of an acylating agent selected from the group consisting of acyl halides and anhydrides of carboxylic acids and a catalyst selected from porous, adsorptive silica-alumina and silica-zirconia composites, reacting the resulting mixture at a temperature of from about 80 to about 150° C. for a period of from about one to about 10 hours and thereafter distilling to yield said hydrocarbon free of said contaminant.

HOWARD D. HARTOUGH.
ALVIN I. KOSAK.
EBENEZER E. REID.

REFERENCES CITED

The following references are of record in the file of this patent:

FOREIGN PATENTS

| Number | Country | Date |
| --- | --- | --- |
| 211,239 | Germany | June 29, 1909 |
| 583,536 | Germany | Sept. 5, 1933 |